United States Patent
Muehling

(10) Patent No.: US 12,534,889 B2
(45) Date of Patent: Jan. 27, 2026

(54) NUT FOR SECURING A SANITARY FAUCET TO A SUPPORT

(71) Applicant: Grohe AG, Hemer (DE)

(72) Inventor: Felix Muehling, Menden (DE)

(73) Assignee: GROHE AG, Hemer (DE)

( * ) Notice: Subject to any disclaimer, the term of this patent is extended or adjusted under 35 U.S.C. 154(b) by 138 days.

(21) Appl. No.: 18/270,535

(22) PCT Filed: Mar. 3, 2022

(86) PCT No.: PCT/EP2022/055441
§ 371 (c)(1),
(2) Date: Jun. 30, 2023

(87) PCT Pub. No.: WO2022/184847
PCT Pub. Date: Sep. 9, 2022

(65) Prior Publication Data
US 2024/0052611 A1    Feb. 15, 2024

(30) Foreign Application Priority Data

Mar. 4, 2021 (DE) .................... 10 2021 105 213.0

(51) Int. Cl.
*E03C 1/04* (2006.01)
(52) U.S. Cl.
CPC .................. *E03C 1/0402* (2013.01)
(58) Field of Classification Search
CPC ... E03C 1/0402; E03C 1/0401; F16B 37/0864
See application file for complete search history.

(56) References Cited

U.S. PATENT DOCUMENTS

| | | | |
|---|---|---|---|
| 6,406,240 B1 * | 6/2002 | Potter | F16B 37/0864 411/270 |
| 6,874,527 B2 | 4/2005 | Meeder | |
| 8,231,318 B2 * | 7/2012 | Pitsch | F16B 37/0864 411/270 |
| 11,199,217 B2 * | 12/2021 | Zhou | F16B 37/0864 |
| 11,644,060 B2 * | 5/2023 | Ma | F16B 37/0864 411/433 |

(Continued)

FOREIGN PATENT DOCUMENTS

| | | |
|---|---|---|
| CN | 110725368 | 1/2020 |
| DE | 7235208 | 1/1973 |

(Continued)

OTHER PUBLICATIONS

International Search Report dated Jun. 9, 2022 in International (PCT) Application No. PCT/EP2022/055441, with English translation.

*Primary Examiner* — Erin Deery
(74) *Attorney, Agent, or Firm* — WENDEROTH, LIND & PONACK, L.L.P.

(57) ABSTRACT

A nut (1) for securing a sanitary faucet (2) to a support (3), comprising:
a base body (4) with a plurality of threaded lugs (5), which can be adjusted in a radial direction (7) when a nut (1) is pushed onto a thread (6) of the sanitary faucet (2), and
a twist lock (8), which can be rotated between a locking position (9) and a release position (10) and which is secured to the base body (4), wherein the twist lock (8) locks the threaded lugs (5) in the locking position (9).

16 Claims, 3 Drawing Sheets

(56) References Cited

U.S. PATENT DOCUMENTS

Figure 1:
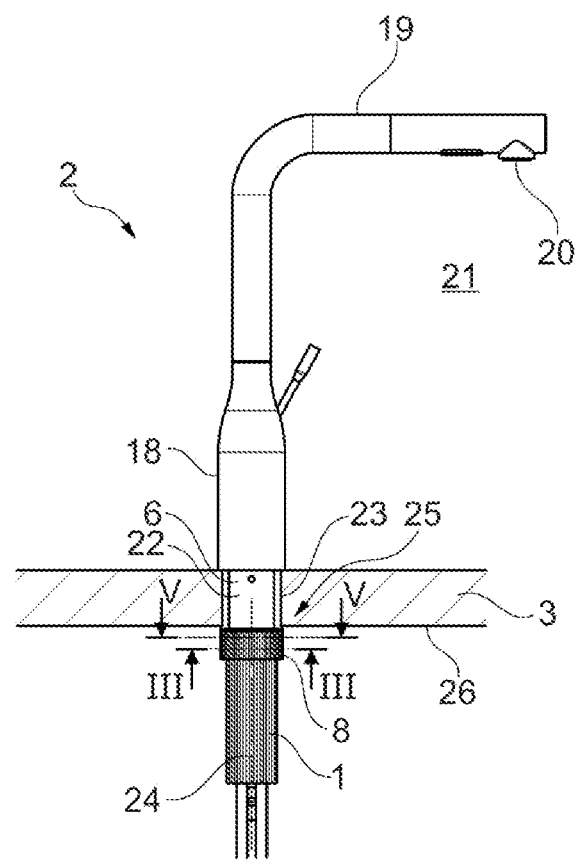

2010/0272503 A1  10/2010  Pitsch et al.
2022/0228622 A1*  7/2022  Sapp ..................... E03C 1/0401

FOREIGN PATENT DOCUMENTS

DE   10 2014 110 638         2/2015
KR        10-1784906        10/2017
SE           1050017 A1  *  11/2017

* cited by examiner

NUT FOR SECURING A SANITARY FAUCET TO A SUPPORT

The present invention relates to a nut for securing a sanitary faucet to a support. Sanitary faucets are used in particular to provide a liquid on demand at sinks, wash basins, bath tubs and/or showers.

The supports routinely have a mounting opening for fastening the sanitary faucets, through which a faucet shaft of the sanitary faucets extends. The faucet shaft can for example be embodied as a threaded sleeve. On the side of the support opposite the sanitary faucet, a nut is screwed onto the faucet shaft, said nut fastening the sanitary faucet to the support. Due to the length of the faucet shaft, tightening the nut on the faucet shaft involves considerable time and effort. For example, tightening the nut can require significantly more than 20 turns.

Therefore, the invention addresses the question of at least partially solving the problems described with respect to the prior art, and in particular, specifying a nut, which can be used to secure a sanitary faucet with minimal effort.

This problem is solved by a nut according to the features of the independent patent claim. Further advantageous embodiments are specified in the dependent patent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A nut for securing a sanitary faucet to a support comprising at least the following contributes to solving the problem:
- a base body with a plurality of threaded lugs, which can be adjusted in the radial direction when the nut is pushed onto a thread of the sanitary faucet, and
- a twist lock, which can be rotated between a locking position and a release position and which is secured to the base body, wherein the twist lock locks the threaded lugs in the locking position.

The (multiple part) nut is in particular designed in the manner of a bolt-nut and/or can be screwed about a longitudinal axis or rotary axis of the nut on a (male) thread. To this end the nut has a base body with a plurality of threaded lugs. The base body can be tubular and/or have a round cross-section. Furthermore, the base body can extend along the longitudinal axis or rotary axis of the nut and/or be in a straight line. In addition, the base body may be made at least partially of plastic or metal. The threaded lugs are in particular embodied in the manner of threaded flanks or tongues. Furthermore, the threaded lugs can be bent on the base body. In addition, a female thread of the base body can be embodied on the threaded lugs.

Furthermore, the nut has a twist lock, which can be rotated relative to the base body and which is secured to the base body. The twist lock can in particular be rotatably secured on a circumferential surface of the base body. Furthermore, the twist lock can be annular. In addition, the twist lock may be made at least partially of plastic or metal. The twist lock is rotatable between a locking position and a release position, in particular to a limited extent. In the release position of the twist lock the threaded lugs are released, so that when securing the sanitary faucet to a support, which for example can be a (counter)top, it is possible to put the nut for example on a faucet shaft of the sanitary faucet embodied as a threaded sleeve. When being put on the faucet shaft, the threaded lugs can be bent or adjusted outwardly in a radial direction, i.e., orthogonally to the longitudinal axis or rotary axis of the nut via the thread of the faucet shaft. Hence, the nut does not have to be screwed over the entire length of the faucet shaft. Upon reaching an underside of the support, the twist lock is rotatable opposite the base body in the locking position, so that the threaded lugs are locked. "Locking" can be understood to mean that the threaded lugs are fixed such that the female thread of the base body can no longer slip in an axial direction of the nut, i.e., in particular parallel to the longitudinal axis or rotary axis of the nut, via the thread of the faucet shaft of the sanitary faucet. Instead, the female thread formed on the threaded lugs can engage in the thread of the faucet shaft, so that the nut can be tightened with a few turns, for example with fewer than five turns. The tightening can occur manually and/or with a wrench. "Locking" can in addition be understood to mean that a bending or adjusting of the threaded lugs in the radial direction outwardly is blocked. As a result, when tightening the nut, the thread of the nut formed on the threaded lugs cannot come loose from the male thread of the faucet shaft of the sanitary faucet.

The base body or the twist lock can consist at least partially of glass fiber reinforced plastic. In particular, the base body and/or the twist lock can consist at least partially of glass fiber reinforced plastic.

The nut can be embodied as a two-piece unit. In particular, this can mean that the nut consists of only two parts, namely the base body and the twist lock.

The base body can have a first length of at least 40 mm (millimeters). In particular, the first length can be 40 mm to 120 mm. The first length is measured in particular parallel to the longitudinal axis or rotary axis of the nut.

The twist lock can have a second length of at least 5 mm. Preferably, the twist lock can have a second length of 5 mm to 40 mm, particularly preferably 25 mm to 30 mm. The second length is measured in particular parallel to the longitudinal axis or rotary axis of the nut.

The twist lock can be rotated between the locking position and the release position by a rotational angle of 10° to 180°. Preferably, the twist lock is rotatable between the locking position and the release position by a rotational angle of 10 to 90°, particularly preferably (substantially) 30°.

The base body can have at least one stop, which limits a rotational angle of the twist lock. The at least one stop can for example extend outwardly in the radial direction. Furthermore, in the locking position the at least one stop can for example contact a first stop surface of the twist lock and/or contact a second stop surface of the twist lock in the release position.

The twist lock can have a plurality of free spaces, in which, in the release position of the twist lock the threaded lugs can be adjusted in the radial direction. The free spaces can for example be embodied in the manner of recesses or grooves. Furthermore, the free spaces can in particular be embodied on an inner surface of the twist lock and/or extend in the radial direction through the twist lock.

The free spaces can have a depth of at least 1 mm. Preferably, the free spaces can have a depth of 1 mm to 10 mm, particularly preferably 1 mm to 5 mm. The depth is measured in particular in the radial direction of the nut, in particular starting from the inner surface of the twist lock.

The twist lock can be guided on the base body between a first axial stop and a second axial stop. The first axial stop and/or second axial stop can extend in particular outwardly in the radial direction from a circumferential surface of the base body. Furthermore, the first axial stop can be embodied at a first longitudinal end of the base body. The second axial stop can be embodied such or can be so small in the radial direction that the twist lock can be put on the base body by means of an elastic deformation of the twist lock and/or of the second axial stop from a second longitudinal end of the base body in the axial direction to the first axial stop. As a result, the twist lock can be secured on the base body with minimal effort.

Figure 2:
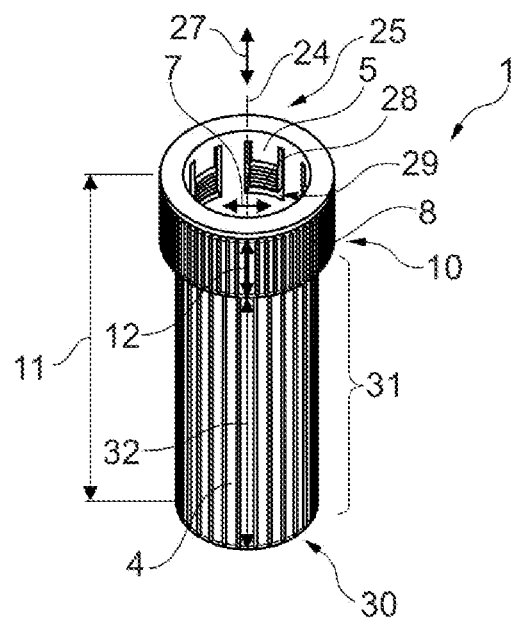
Figure 3:
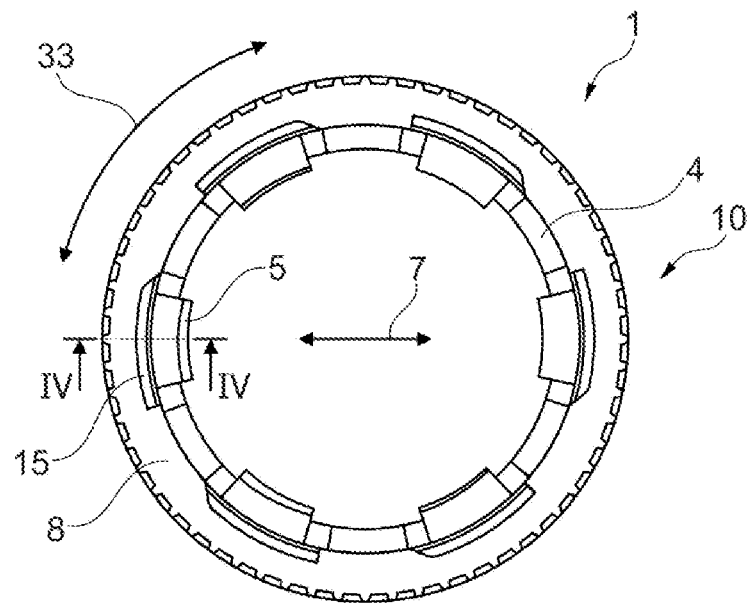
Figure 4:
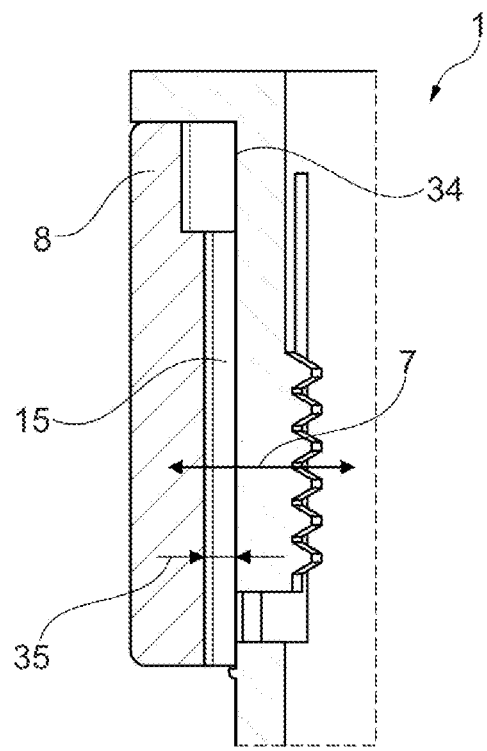
Figure 5:
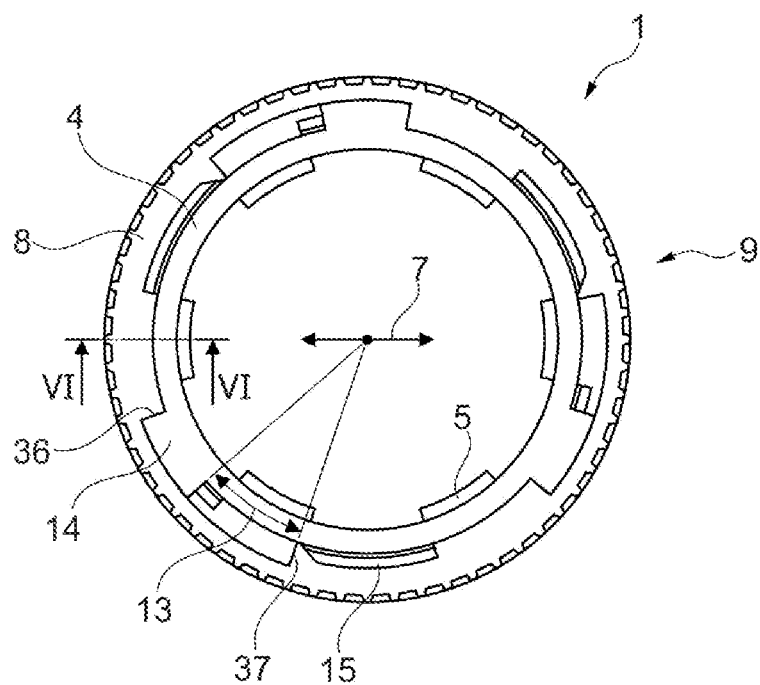
Figure 6:
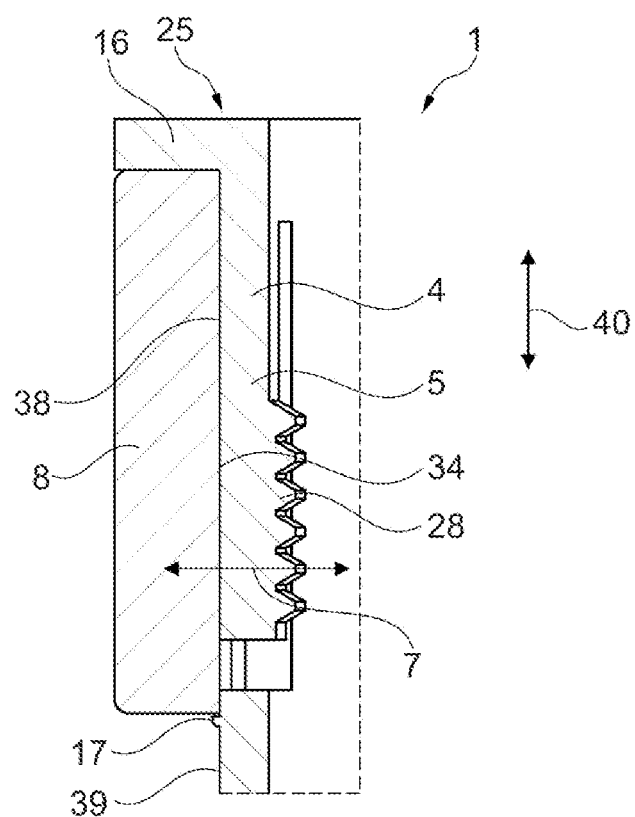

Subsequently, the invention and the technical environment will be explained in greater detail based on the figures. It should be noted that the figures show an especially preferable embodiment variant of the invention, but the invention is not limited thereto. Identical components in the figures have been provided with the same reference numerals. The figures show the following by way of example and schematically:

FIG. 1: a lateral view of a sanitary faucet secured with a nut to a support;

FIG. 2: a perspective view of the nut;

FIG. 3: a first sectional representation of the nut along a line of intersection III-III shown in FIG. 1;

FIG. 4: a second sectional representation of the nut along a line of intersection IV-IV shown in FIG. 3;

FIG. 5: a third sectional representation of the nut along a line of intersection IV-IV shown in FIG. 3; and FIG. 6: a fourth sectional representation of the nut along a line of intersection VI-VI shown in FIG. 5.

FIG. 1 shows a lateral view of a sanitary faucet 2 secured with a nut 1 to a support 3. The sanitary faucet 2 has a faucet housing 18 with a pivotable outlet 19. An outlet opening 20 is embodied at the outlet 19, by means of which the sanitary faucet 2 can dispense liquid to an environment 21. A faucet shaft 22 having a thread 6 of the sanitary faucet 2 is inserted through a mounting opening 23 of the support 3 and secured to the support 3 using the nut 1. To this end, a twist lock 8 of the nut 1 was turned to a release position 10 shown in FIG. 3 and the nut 1 subsequently put on the faucet shaft 22 along its longitudinal axis 24, until a first longitudinal end 25 of the nut 1 abuts on an underside 26 of the support 3. Then the twist lock 8 was adjusted to a locking position 9 shown in FIG. 5 and the nut 1 was subsequently manually tightened against the underside 26 of the support 3.

FIG. 2 shows a perspective view of the nut 1. The (multiple part) nut 1 or nut assembly comprises a base body 4 and the twist lock 8, which is rotatably secured on the base body 4. The base body 4 is tubular and extends along the longitudinal axis 24 from the first longitudinal end 25 to a second longitudinal end 30. Furthermore, the base body 4 has a first length 11 along the longitudinal axis 24 and the twist lock 8 has a second length 12. In addition, the base body 4 comprises a plurality of threaded lugs 5 in the region of the twist lock 8, at which a female thread 28 of the base body 4 is formed. The threaded lugs 5 extend parallel to the longitudinal axis 24 in a longitudinal direction 27, wherein a protruding end 29 of the threaded lugs 5 is oriented toward the second longitudinal end 30 of the base body 4. The twist lock 8 is located in a release position 10 here, in which, when the nut 1 is put on the faucet shaft 22 of the sanitary faucet 2 shown in FIG. 1, the threaded lugs 5 are outwardly adjustable or bendable by means of the thread 6 formed on the faucet shaft 22. As a result, the nut 1 can be pushed onto the faucet shaft 22 without rotation parallel to the longitudinal axis 24. The base body 4 comprises a handle portion 31, which extends from the twist lock 8 to the second longitudinal end 30 and has a third length 32 parallel to the longitudinal axis 24.

FIG. 3 shows a first sectional representation of the nut 1 along a line of intersection III-III shown in FIG. 1. In particular, in the embodiment variant of the nut 1 shown here it can be seen that the base body 4 has six threaded lugs 5, which are evenly distributed in a circumferential direction 33 of the nut 1. The twist lock 8 is in the release position 10 here, in which free spaces 15 in the radial direction 7 are in accord with the threaded lugs 5. As a result, the threaded lugs 5 are outwardly adjustable in the radial direction 7 in the free spaces 15 of the twist lock 8.

FIG. 4 shows a second sectional representation of the nut 1 along a line of intersection IV-IV shown in FIG. 3. The free space 15 has a depth 35 starting from an inner surface 34 of the twist lock 8 outwardly in the radial direction 7.

FIG. 5 shows a third sectional representation of the nut 1 along a line of intersection IV-IV shown in FIG. 3. In the third sectional representation it can be seen that the base body 4 has three stops 14, which extend outwardly in the radial direction 7. Compared to the release position 10 of the twist lock 8 shown in FIG. 3, the twist lock 8 in FIG. 5 has been adjusted or turned counterclockwise by a rotational angle 13 to a locking position 9 relative to the base body 4, until first stop surfaces 36 of the twist lock 8 contact the stops 14 of the base body 4, so that the twist lock 8 can no longer be rotated counterclockwise relative to the base body 4. In the locking position 9 the free spaces 15 of the twist lock 8 in the radial direction 7 are not (completely) in accord with the threaded lugs 5 of the base body 4. As a result, the threaded lugs are 5 locked, so that said threaded lugs are not adjustable outwardly in the radial direction 7. From the locking position 9, the twist lock 8 can be adjusted relative to the base body 4 clockwise by the rotational angle 13 back to the release position 10 shown in FIG. 3, until second stop surfaces 37 of the twist lock 8 contact the stops 14 of the base body 4, so that the twist lock 8 cannot be rotated further clockwise relative to the base body 4.

FIG. 6 shows a fourth sectional representation of the nut 1 along a line of intersection VI-VI shown in FIG. 5. It can be seen in FIG. 6 that an external surface 38 of the threaded lugs 5 of the base body 4 directly abuts on the inner surface 34 of the twist lock 8, so that the threaded lugs 5 are not outwardly adjustable in the radial direction 7. As a result, the female thread 28 of the base body 4 cannot slip over the thread 6 of the faucet shaft 22 shown in FIG. 1, but is instead in engagement with the thread 6. As a result, the nut 1 on the faucet shaft 22 can be tightened by one turn about the longitudinal axis 24 shown in FIG. 2. The twist lock 8 is guided on the base body 4 between a first axial stop 16 and a second axial stop 17, so that the twist lock 8 cannot come loose from the base body 4 in an axial direction 40, i.e., parallel to the longitudinal axis 24 of the base body 4 shown in FIG. 2. The axial stops 16, 17 extend outwardly from a circumferential surface 39 of the base body 4 in the radial direction 7. The first axial stop 16 is formed on the first longitudinal end 25 of the base body 4. The second axial stop 17 is embodied such or is so small in the radial direction 7 that the twist lock 8 can be pushed onto the base body 4 in the axial direction 14 to the first axial stop 16 by means of an elastic deformation of the twist lock 8 and/or of the second axial stop 17 from the second longitudinal end 30 of the base body 4 shown in FIG. 2.

By means of the present invention, sanitary faucets can be secured with minimal effort.

LIST OF REFERENCES 1 nut
2 sanitary faucet
3 support
4 base body 5 threaded lug
6 thread
7 radial direction
8 twist lock
9 locking position
10 release position
11 first length
12 second length
13 rotational angle
14 stop
15 free space
16 first axial stop
17 second axial stop
18 faucet housing
19 outlet
20 outlet opening
21 environment
22 faucet shaft
23 mounting opening
24 longitudinal axis
25 first longitudinal end
26 underside
27 longitudinal direction
28 female thread
29 protruding end
30 second longitudinal end
31 handle portion
32 third length
33 circumferential direction
34 inner surface
35 depth
36 first stop surface
37 second stop surface
38 external surface
39 circumferential surface
40 axial direction

The invention claimed is:

1. A nut (1) for securing a sanitary faucet (2) to a support (3), the nut (1) comprising:
   a base body (4) comprising six threaded lugs (5), a first longitudinal end (25), a second longitudinal end (30), and a handle portion (31), and
   a twist lock (8) secured to the base body (4), which can be rotated between a locking position (9) and a release position (10), wherein the twist lock (8) locks the six threaded lugs (5) in the locking position (9);
   wherein the handle portion (31) is a continuous surface of revolution extending from the twist lock (8) to the second longitudinal end (30),
   the sanitary faucet (2) comprises a thread (6) and a faucet shaft (22) having a longitudinal axis (24),
   the nut (1) can be pushed onto the thread (6) without rotation parallel to the longitudinal axis (24) of the faucet shaft (22), and
   when the nut (1) is pushed onto the thread (6), the six threaded lugs (5) are outwardly adjustable in a radial direction (7) of the base body (4).

2. The nut (1) according to claim 1, wherein at least one of the base body (4) and the twist lock (8) comprises a glass fiber reinforced plastic.

3. The nut (1) according to claim 1, wherein the nut (1) is embodied as a two-piece unit.

4. The nut (1) according to claim 1, wherein the base body (4) further comprises a first length (11) of at least 40 mm.

5. The nut (1) according to claim 1, wherein the twist lock (8) comprises a second length (12) of at least 5 mm.

6. The nut (1) according to claim 1, wherein the twist lock (8) can be rotated between the locking position (9) and the release position (10) by a rotational angle (13) of 10° to 180°.

7. The nut (1) according to claim 1, wherein the base body (4) comprises at least one stop (14), which limits a rotational angle (13) of the twist lock (8).

8. The nut (1) according to claim 7, wherein the base body (4) comprises three stops (14).

9. The nut (1) according to claim 1, wherein the twist lock (8) comprises six free spaces (15), wherein the six threaded lugs (5) are adjustable in the radial direction (7) in the release position (10) of the twist lock (8).

10. The nut (1) according to claim 9, wherein the six free spaces (15) have a depth (35) of at least 1 mm.

11. The nut (1) according to claim 1, wherein the twist lock (8) is guided on the base body (4) between a first axial stop (16) and a second axial stop (17).

12. The nut (1) according to claim 1, wherein the twist lock (8) comprises six free spaces (15), and in the locking position (9) the six free spaces (15) are not completely in accord with the six threaded lugs (5) of the base body (4).

13. The nut (1) according to claim 1, wherein the twist lock (8) can be rotated between the locking position (9) and the release position (10) by a rotational angle (13) of 30°.

14. The nut (1) according to claim 1, wherein the base body (4) further comprises a first length (11) extending from the first longitudinal end (25) to the second longitudinal end (30) along a longitudinal direction (27), and the twist lock (8) comprises a second length (12) extending along the longitudinal direction (27), and wherein the first length (11) is longer than the second length (12).

15. The nut (1) according to claim 14, wherein the first length (11) is 3 to 8 times longer than the second length (12).

16. The nut (1) according to claim 1, wherein the handle portion (31) is a cylinder.

* * * * *